United States Patent Office 3,732,240
Patented May 8, 1973

3,732,240
THIAZOLO[3,4-a]BENZIMIDAZOLE DERIVATIVES
AND PROCESS
Rudiger D. Haugwitz, Highland Park, and Venkatachala
L. Narayanan, Hightstown, N.J., assignors to E. R.
Squibb & Sons, Inc., New York, N.Y.
No Drawing. Filed Jan. 21, 1971, Ser. No. 108,600
Int. Cl. C07d 99/06
U.S. Cl. 260—306.7  6 Claims

ABSTRACT OF THE DISCLOSURE

Thiazolo[3,4-a]benzimidazoles are provided which are useful as antiparasitic and antiinflammatory agents.

This invention relates to thiazolo[3,4-a]benzimidazoles having the structures

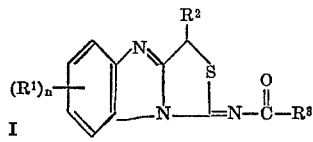

I and

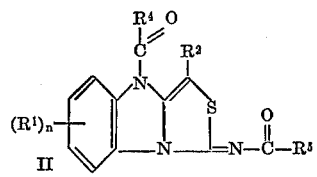

II wherein $R^1$ can be halogen, nitro, lower alkyl, aryl, lower alkylaryl, aryl lower alkyl, lower alkoxy, cyano, thiocyano, hydroxy, arylamino, alkylamino, or

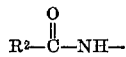

$R^2$ can be hydrogen, alkyl containing from one to about five carbon atoms, haloalkyl, aryl, alkylaryl, or arylalkyl; $R^3$ can be any of the $R^2$ radicals, alkylamino, arylamino, aryl-lower alkylamino, lower alkylarylamino, or acylamino

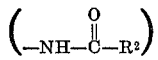

$R^4$ can be any of the $R^2$ radicals as well as alkoxy or aryloxy; $R^5$ can be any of the $R^2$ radicals as well as lower alkylamino, arylamino, aryl-lower alkylamino, lower alkylarylamino, acylamino

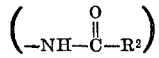

alkoxy or aryloxy; and $n$ is 0, or 2.

The lower alkyl group represented by the R symbols, includes straight or branched chain aliphatic hydrocarbon radicals having up to seven (unless stated otherwise) carbon atoms, such as methyl, ethyl, propyl, isopropyl, butyl, isobutyl, t-butyl, amyl, hexyl, heptyl, and the like. The lower alkyl groups can include substitutents such as any of the aryl groups mentioned below; e.g., benzyl or phenethyl, or halogens.

With respect to $R^1$, $R^4$ and $R^5$, the lower alkoxy groups represented thereby include straight and branched chain radicals of up to seven carbon atoms, corresponding to the above alkyl groups, e.g., methoxy, ethoxy, propoxy, isopropoxy, and the like, and can include substituents such as aryl.

$R^1$ can include each of the four halogens, but chlorine and bromine are preferred.

The substituted amino groups include mono- or di- lower alkyl, or arylamino wherein lower alkyl and aryl are as defined herein, such as methylamino, ethylamino, isopropylamino, heptylamino, dimethylamino, diethylamino, methylethylamino, methylbutylamino, ethyl i-propylamino, phenylamino diphenylamino, naphthylamino, or N-methyl-N-phenylamino and the like.

The term aryl or aryloxy includes monocyclic or bicyclic moonvalent aromatic ring systems such as phenyl or naphthyl or phenoxy or naphythyloxy. These aryl radicals can include as substituents nitro, halogen, or any of the alkyl groups mentioned hereinbefore.

It is to be understood that where more than one R substituent is present, each R may be the same or different.

Preferred compounds of Formula I are those where $R^1$ is H, $R^2$ is H, and $R^3$ is $NHC_2H_5$ or $CH_3$; preferred compounds of Formula II are those where $R^5$ and $R^4$ are the same and are methyl or phenyl and $R^1$ and $R^2$ are H.

Compounds of Formula I wherein $R^3$ is alkylamino, arylamino or acylamino are prepared by reacting a thiazolo[3,4-a]benzimidazole III with the corresponding isocyanate IV:

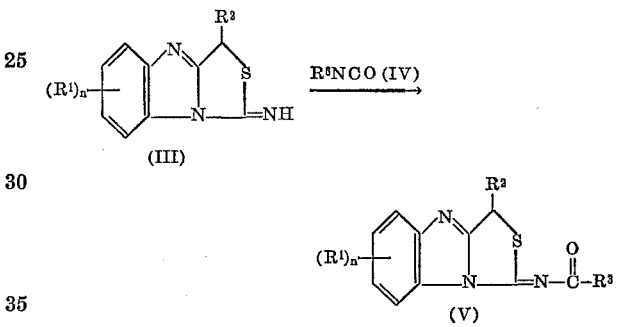

wherein $R^6$ is alkyl, aryl, acyl or aroyl, at a temperature within the range of from about 0° to about 140°, for periods of from about 30 minutes to about 24 hours, in a molar ratio of III to IV within the range from about 1:1 to about 1:100.

Solvents which can be employed in carrying out the above reaction include esters such as ethyl acetate, ethers such as glyme, ketones such as ethyl methyl ketone and aromatic hydrocarbons such as benzene, toluene, xylene, etc.

Compounds of Formula I wherein $R^3$ can be any of the $R^2$ radicals (hydrogen, lower alkyl, aryl, alkylaryl, arylalkyl) are synthesized from benzimidazole III and approximately an equivalent amount of an appropriate acid anhydride VIIa or acid halide VIIb, at a temperature within the range of from about 0° to about 120°; for periods ranging from about 5 minutes to 1 hour.

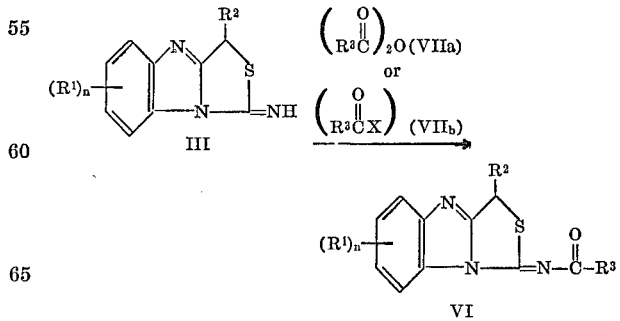

wherein X can be Cl or Br.

Compounds of Formula II where $R^4$ and $R^5$ are the same representing alkyl or aryl (diamides) are conveniently prepared by reacting III with the corresponding acid halides VIIIb or acid anhydrides VIIIa optionally, in the presence of a base such as a tertiary amine or sodium acetate. The same solvents, temperatures and reaction times that are applicable for preparing Compound V can be utilized for the synthesis of the diamides VIII. The molar ratio of III:VIIIa or b can range from about 1:2 to about 1:100.

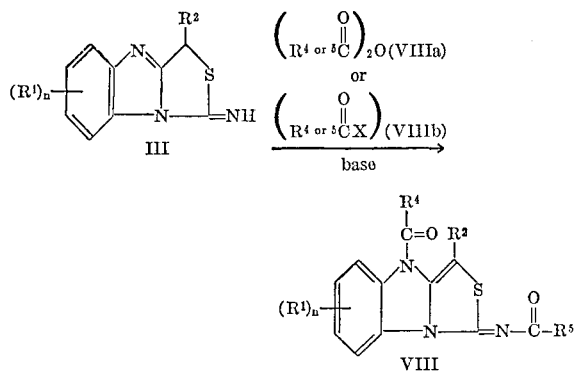

Examples of acid halides which can be employed include acetyl chloride, propionyl chloride, benzoyl chloride or acetyl bromide. Examples of acid anhydrides which can be employed include acetic anhydride, propionic anhydride, butyric anhydride and benzoic anhydride.

Compounds of Formula II where $R^4$ represents alkyl or aryl, $R^5$ (which is the same as $R^3$ in Formula V) represents alkylamino, arylamino, or acylamino are prepared by first synthesizing V as previously described and then subjecting these ureas to acylating conditions, e.g., reacting with an acid halide or acid anhydride and optionally in the presence of a base:

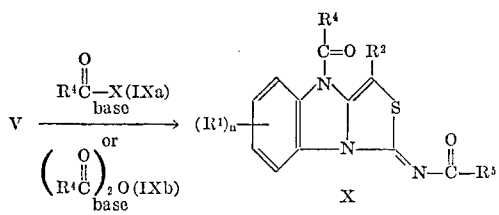

The same solvents, temperatures, reaction time that apply for preparing compound V can be utilized for these amide ureas. Molar ratios of V to IXa or b can range from about 1:1 to about 1:200.

Compounds of Formula II wherein $R^4$ and $R^5$ are the same and are alkoxy or aryloxy can be prepared by reacting a thiazolo[3,4-a]benzimidazole of the structure III with a halocarbonic acid ester of the structure XI XI

wherein $R^5$ is alkoxy or aryloxy, X is Cl or Br, in a molar ratio of III:XI of about 1:2 to about 1:300 at a temperature within the range of from about 0° to about 140° to form a compound of the structure XII

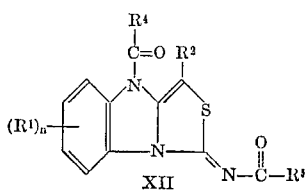

wherein $R^4$ and $R^5$ are defined above.

Bases, optionally, can be employed including triethylamine, pyridine or sodium acetate.

The starting materials of Formula III can be prepared by forming a thiocyanic acid ester of a benzimidazole of the structure XIII
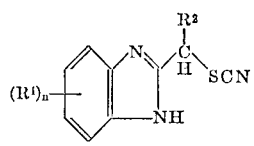

wherein $R^1$, $R^2$ and $n$ are as defined hereinbefore, and then cyclizing the thiocyanic acid ester to form the tricyclic compounds. Intramolecular cyclization to form the tricyclic compounds of the invention is carried out by dissolving the thiocyanic acid ester XIII in a protic solvent, for example, a monohydric or polyhydric alcohol containing up to about five carbon atoms, such as methanol, ethanol, isoamyl alcohol or glycerol, or an aprotic solvent, such as dimethyl sulfoxide, dimethyl formamide, acetonitrile, ethyl acetate or diglyme, and heating the resulting solution at elevated temperatures ranging from about 35° to about 165°, for periods ranging from one to twenty-four hours.

Alternatively, tricyclic ring-structures of Formula III can be synthesized directly from 2-halomethyl benzimidazoles XIV and thiocyanic acid salts in suitable solvents at elevated temperatures:

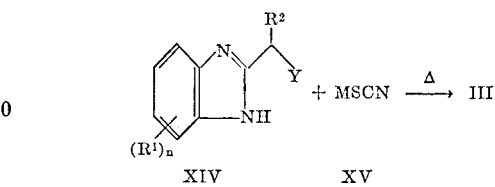

where $R^1$ and $R^2$ are as defined earlier, Y=Cl, Br, or I, and M is an alkali metal such as sodium, potassium or lithium, an alkaline earth metal such as calcium, barium or magnesium, or ammonium. Protic or aprotic solvents such as stated previously, can be advantageously employed at temperatures ranging from about 35° to about 100°, for periods of about 10 minutes to several hours.

The thiocyanic acid salts XV are employed in a molar ratio to the 2-halomethyl benzimidazoles XIV of within the range from about 1:1 to about 10:1 and preferably from about 1:1 to about 4:1.

The thiocyanic acid esters of benzimidazoles XIII can be prepared as described in U.S. application Ser. No. 17,320, filed Mar. 6, 1970, now U.S. Patent No. 3,678,066, the disclosure of which is incorporated herein by reference.

The compounds of Formulae I and II form physiologically acceptable acid-addition salts with inorganic and organic acids. These acid-addition salts frequently provide useful means for isolating the product from reaction mixtures by forming the salt in a medium in which it is insoluble. The free base may then be obtained by neutralization, e.g., with a base such as sodium hydroxide. Then any other salt may again be formed from the free base and the appropriate inorganic or organic acid. Illustrative are the hydrohalides, especially the hydrochloride and hydrobromide which are preferred, sulfate, nitrate, phosphate, oxalate, tartrate, maleate, fumarate, pamoate, citrate, succinate, benzoate, ascorbate, methanesulfonate, benzenesulfonate, toluenesulfonate, and the like.

The compounds of this invention can be utilized as parasiticides and rodenticides, being particularly useful against *Crithidia fasciculata*. These compounds when utilized as parasiticides form the active ingredient in feed stuffs for cattle, hogs and chickens, being admixed with said feed stock in from 0.1 to 25 mg. per 100 kg. weight of feed stuffs with the most preferred range being from about 5 to 10 mg. per 100 kg. of feed stuffs.

As anti-inflammatory agents, the compounds of this invention may be used topically in lieu of and in the same manner as cortisone in the treatment of acute inflammatory and allergic conditions of the eye, skin or mucosa, e.g., as suspension, ointment or cream containing about 0.1 to about 2.5% by weight, of a compound of Formula I or II or physiologically acceptable salt thereof. In the rabbit or cow, for example, a 1% ointment is applied to the skin area 3 to 4 times daily.

The following examples, in the opinion of the inventors, represent preferred embodiments of their invention:

EXAMPLE 1

1-Phenyl-3-[1H,3H-thiazolo[3,4-a]benzimidazol-1-ylidene]urea

A mixture of 34 g. of 2-chloromethyl-benzimidazole, and 60 g. of ammonium thiocyanate in 1,000 ml. of methanol, is refluxed for one hour. The solution is evaporated to about half its volume and then chilled.

The resulting solid separates and is filtered off. Recrystallization from methanol yields 8.3 g. of pure 1-imino-1H,3H-thiazolo[3,4-a]benzimidazole, M.P. 169–170°.

A mixture of 5.7 g. 1 - imino-1H,3H-thiazolo[3,4-a]-benzimidazole as prepared above, 10 ml. of phenyl isocyanate and 50 ml. of ethyl acetate is refluxed for one hour. The solvent is evaporated and the residue crystallized twice from benzene to yield 4 g. of product, M.P. 160° (melts, solidifies, melts again at 195–197°).

*Analysis.*—Calcd. for $C_{16}H_{12}N_4OS$ (percent): C, 62.32; H, 3.92; N, 18.17. Found (percent): C, 62.20; H, 4.09; N, 17.98.

EXAMPLE 2

(1-p-Nitrophenyl)-3-(1H,3H-thiazolo[3,4-a]benzimidazol-3-ylidene)urea

To a solution of 2.7 g. of 1-imino-1H,3H-thiazolo [3,4-a]benzimidazole as prepared in Example 1 in 250 ml. of ethyl acetate there is added 5 g. of p-nitrophenylisocyanate dissolved for 30 minutes the flask content is cooled and the product filtered off. Crystallization from pyridine furnishes 2.5 g., M.P. 260–262°.

*Analysis.*—Calcd. for $C_{16}H_{11}N_5O_3S$ (percent): C, 54.38; H, 3.14; N, 19.82. Found (percent): C, 54.60; H, 3.32; N, 19.83.

EXAMPLE 3

1-(1H,3H-thiazolo-[3,4-a]benzimidazol-3-ylidene)-3-(trichloroacetyl)urea

A solution of 4.8 g. of 1-imino-1H,3H-thiazolo[3,4-a] benzimidazole in 500 ml. of ethyl acetate is warmed to 50° With stirring there is added a solution of 5 g. of trichloroacetylisocyanate in 100 ml. of ethyl acetate. This mixture is stirred for 30 minutes and the solid is filtered off. Upon dissolving the product in a minimum of dimethylsulfoxide the product is precipitated with water to yield 3 g., M.P. 180–182°.

*Analysis.*—Calcd. for $C_{12}H_7Cl_3N_4O_2S$ (percent): C, 38.17; H, 1.88; N, 14.84. Found (percent): C, 37.99; H, 1.89; N, 15.06.

EXAMPLES 4 TO 13

Following the procedure of Examples 1 to 3, substituting the 1 - imino - 1H,3H-thiazolo-[3,4-a]benzimidazole shown in column 1 of Table I below and the isocyanate shown in column 2, the product shown in column 3 is obtained.

TABLE I

| Example No. | I | | | $R^6$—N=C=O | V | | | |
|---|---|---|---|---|---|---|---|---|
| | $R^1$ | $n$ | $R^2$ | $R^6$ | $R^1$ | $n$ | $R^2$ | $R^3$ |
| 4 | | 0 | $CH_2$—$C_6H_5$ | $CH_3$ | | 0 | —$CH_2C_6H_5$ | —$NHCH_3$ |
| 5 | | 0 | $CH_3$ | $CH_2C_6H_5$ | | 0 | $CH_3$ | —$NHCH_2C_6H_5$ |
| 6 | {6-$CH_3$, 7-$CH_3$} | 2 | $CH_3$ | —⟨C₆H₄⟩—Cl | {6-$CH_3$, 7-$CH_3$} | 2 | $CH_3$ | —NH—⟨C₆H₄⟩—Cl |
| 7 | 8-SCN | 1 | H | $C_6H_5$ | 8-SCN | 1 | H | —$NHC_6H_5$ |
| 8 | 6-F | 1 | H | $C_2H_5$ | 6-F | 1 | H | —$NHC_2H_5$ |
| 9 | 5-$CH_3O$ | 1 | H | $C_3H_7$ | 5-$CH_3O$ | 1 | H | —$NHC_3H_5$ |
| 10 | 6-$CH_3NH$— | 1 | $CH_3$—⟨C₆H₄⟩— | —⟨C₆H₄⟩—$CH_3$ | 6-$CH_3NH$— | 1 | $CH_3$—⟨C₆H₄⟩— | —NH—⟨C₆H₄⟩—$CH_3$ |
| 11 | 7-$C_6H_5NH$— | 1 | H | $\overset{O}{\underset{\|}{C}}C_6H_5$ | 7-$C_6H_5NH$— | 1 | H | —NHCOC₆H₅ |
| 12 | 5-OH | 1 | $CH_3$ | $C_4H_9$ | 5-OH | 1 | $CH_3$ | —$NHC_4H_9$ |
| 13 | {5-I, 6-$CH_3$} | 2 | H | $C_5H_{11}$ | {5-I, 6-$CH_3$} | 2 | H | —$NHC_5H_{11}$ |

EXAMPLE 14

1-(acetylimino)-1H,3H-thiazolo[3,4-a]benzimidazole

A mixture of 0.5 g. 1-imino-1H,3H-thiazolo[3,4-a]-benzimidazole is heated for about 3 minutes in 10 ml. of acetic anhydride until the solid just dissolves. The mixture is cooled and treated with petroleum ether (30–60°); the solid which is formed, is filtered off, dried and crystallized from acetone to yield 0.2 g., M.P. 195–197°.

Calcd. for $C_{11}H_9N_3OS$ (percent): C, 57.13; H, 3.83; N, 18.17. Found (percent): C, 57.38; H, 3.94; N, 18.02.

EXAMPLES 15 to 19

Following the procedure of Example 14, but substituting the 1 - imino-1H,3H-thiazolo[3,4-a]benzimidazole shown in column 1 of Table II below and the acid anhydride shown in column 2, the product shown in column 3 is obtained.

TABLE II

| Example No. | R¹ | n | R² | R³ (anhydride) | R¹ | n | R² | R³ (product VI) |
|---|---|---|---|---|---|---|---|---|
| 15 | — | 0 | H | $CH_3$ | — | 0 | H | $CH_3$ |
| 16 | 7-$CH_3$ | 1 | $CH_3$ | $C_6H_5$ | 7-$CH_3$ | 1 | $CH_3$ | $C_6H_5$ |
| 17 | 6-Cl | 1 | $CH_2$—$C_6H_5$ | $C_2H_5$ | 6-Cl | 1 | $CH_2$—$C_6H_5$ | $C_2H_5$ |
| 18 | 5-$CH_3O$ | 1 | H | $CH_2C_6H_5$ | 5-$CH_3O$ | 1 | H | $CH_2C_6H_5$ |
| 19 | 8-Cl | 1 | $CH_3$—⟨C₆H₄⟩—$CH_2$— | $CH_3$—⟨C₆H₄⟩— | 8-Cl | 1 | $CH_3$—⟨C₆H₄⟩—$CH_2$— | $CH_3$—⟨C₆H₄⟩— |
| 20 | {6-$CH_3$, 7-$CH_3$} | 2 | H | $C_5H_{11}$ | {6-$CH_3$, 7-$CH_3$} | 2 | H | $C_5H_{11}$ |

EXAMPLE 21

9-acetyl-3-(acetylimino)-9H-thiazolo[3,4-a]benzimidazole

A mixture of 5 g. 1-imino-1H,3H-thiazolo[3,4-a]-benzimidazole, 20 ml. acetic anhydride and 5 g. powdered sodium acetate is heated on the steam bath for five minutes. On cooling a solid separates which is filtered off and washed with water.

Crystallization from chloroform yields 3 g. of pure product, M.P. 258–261°.

*Analysis.*—Calcd. for $C_{13}H_{11}N_3O_2S$ (percent): C, 57.13; H, 4.03; N, 15.38. Found (percent): C, 56.88; H, 4.04; N, 15.38.

EXAMPLE 22

9-benzoyl-3-(benzoylimino)-3H,9H-thiazolo[3,4-a]benzimidazole

To a solution of 1.9 g. of 1-imino-1H,3H-thiazolo-[3,4-a]benzimidazole as prepared in Example 1 in 250 ml. of ethyl acetate and 10 ml. of triethylamine there is added 3.1 g. benzoyl chloride. The mixture is refluxed for 30 minutes and then filtered hot. The filtered-off solid is washed with water and crystallized from ethyl acetate to yield 2 g. of product, M.P. 232–234°.

*Analysis.*—Calcd. for $C_{23}H_{15}N_3O_2S$ (percent): C, 69.51; H, 3.81; N, 10.67. Found (percent): C, 69.51; H, 3.73; N, 10.52.

EXAMPLES 23 to 28

Following the procedure of Examples 21 and 22 but substituting the 1-imino-1H,3H-thiazolo[3,4-a]benzimidazole shown in column 1 of Table III below and the acid anhydride or acid halide shown in column 2, the product shown in column 3 is obtained.

TABLE III

| Example No. | R¹ | n | R² | R⁴ or ⁵ | R¹ | n | R² | R⁴=R⁵ |
|---|---|---|---|---|---|---|---|---|
| 23 | 6-$CH_3O$ | 1 | H | —$CH_2$—$C_6H_5$ | 6-$CH_3O$ | 1 | H | —$CH_2C_6H_5$ |
| 24 | 6-$CH_3NH$— | 1 | $C_5H_{11}$ | $CH_3$ | 6-$CH_3NH$— | 1 | $C_5H_{11}$ | $CH_3$ |
| 25 | {6-$CH_3$, 7-$CH_3$} | 2 | H | $C_6H_5$ | {6-$CH_3$, 7-$CH_3$} | 2 | H | $C_6H_5$ |
| 26 | 8-Cl | 1 | $CH_3$—⟨C₆H₄⟩— | ⟨C₆H₄⟩—$NO_2$ | 8-Cl | 1 | $CH_3$—⟨C₆H₄⟩— | ⟨C₆H₄⟩—$NO_2$ |
| 27 | 5-$C_4H_9O$ | 1 | $CH_3$ | —$CH_2$—⟨C₆H₄⟩—Cl | 5-$C_4H_9O$ | 1 | $CH_3$ | —$CH_2$—⟨C₆H₄⟩—Cl |
| 28 | 7-OH | 1 | $C_6H_5$ | $C_2H_5$ | 7-OH | 1 | $C_6H_5$ | $C_2H_5$ |

EXAMPLE 29

1-(4-acetyl-1H,4H-thiazolo[3,4-a]benzimidazol-1-ylidene)-3-phenylurea

A mixture of 2.8 g. 1-phenyl-3-[1H,3H-thiazolo[3,4-a]-benzimidazol-1-ylidene]urea is heated on a steam bath together with 35 ml. of acetic anhydride for 15 minutes. At this time a yellow solid has formed which is filtered off, dried and crystallized from ethyl acetate to give 2.5 g. M.P. 153–155°.

Calcd. for $C_{18}H_{10}N_4O_2$ (percent): C, 61.70; H, 4.03; N, 15.99. Found (percent): C, 61.90; H, 3.95; N, 15.77.

EXAMPLES 30 to 24

Following the procedure of Example 29, but substituting the urea shown in column 1 of Table IV below and the acid halide or acid anhydride shown in column 2, the product shown in column 3 is obtained.

TABLE IV

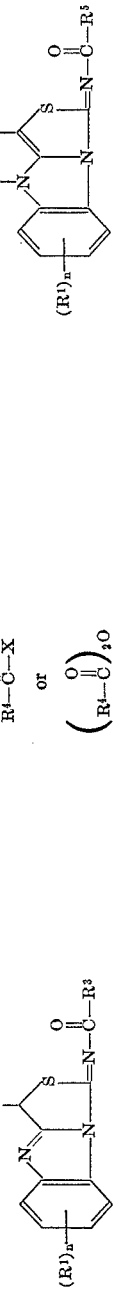

| Example No. | R¹ | n | R² | R⁴ | Prepared in Example | R¹ | n | R² | R⁴ | R⁵ |
|---|---|---|---|---|---|---|---|---|---|---|
| 30 | {6-CH₃ / 7-CH₃} | 2 | CH₃ | CH₃ | 6 | {6-CH₃ / 7-CH₃} | 2 | CH₃ | CH₃ | —NH—C₆H₄—Cl |
| 31 | 8-SCN | 1 | H | C₆H₅ | 7 | 8-SCN | 1 | H | C₆H₅ | —NHC₆H₅ |
| 32 | 6-F | 1 | H | CH₂C₆H₅ | 8 | 6-F | 1 | H | CH₂C₆H₅ | —NHC₂H₅ |
| 33 | 5-CH₃O | 1 | H | CH₃ | 9 | 5-CH₃O | 1 | H | CH₃ | —NHC₃H₇ |
| 34 | 6-CH₃NH— | 1 | CH₃ | CH₃ | 10 | 6-CH₃NH— | 1 | CH₃ | CH₃ | —NH—C₆H₄—CH₃ |

EXAMPLE 35

1-(carboxyimino)-1H,4H-thiazolo[3,4-a]benzimidazol-4-carboxylic acid, diethyl ester A mixture of 5 g. 1-imino-1H,3H-thiazolo[3,4-a]benzimidazole and 50 ml. of freshly distilled chloroethyl carbonate is refluxed for 1.5 hours. The mixture is cooled, and the solid is filtered off, and washed consecutively with 10% sodium hydroxide and water until no halogen can be detected in the solid by means of the Beilstein test. The dried solid is crystallized from ethyl acetate, then twice from benzene to furnish 1.2 g. M.P., 162–163°.

Calcd. from C₁₅H₁₅N₃O₄S (percent): C, 54.04; H, 4.54; N, 12.60. Found (percent): C, 54.20; H, 4.47; N, 12.49.

EXAMPLES 36 to 40

Following the procedure of Example 35, but substituting the 1-imino-1H,3H-thiazolo[3,4-a]benzimidazole shown in column 1 and the halocarbonic acid ester shown in column 2, the product shown in column 3 is obtained.

TABLE V

| Ex. No. | R¹ | n | R² | R⁵ | X | R¹ | n | R² | R⁵ |
|---|---|---|---|---|---|---|---|---|---|
| 36 | 6-I | 1 | —CH₂C₆H₅ | C₄H₉O | Cl | 6-I | 1 | —CH₂C₆H₅ | OC₄H₉ |
| 37 | {6-C₂H₅ / 7-C₂H₅} | 0 | CH₃ | C₂H₅O | Br | {6-C₂H₅ / 7-C₂H₅} | 0 | CH₃ | OC₃H₇ |
| 38 | | 2 | H | CH₃O | Cl | | 2 | H | OCH₃ |
| 39 | 7-CH₃NH— | 1 | CH₃ | C₆H₅O | Br | 7-CH₃NH— | 1 | CH₃ | OC₆H₅ |
| 40 | 5-C₆H₅NH— | 1 | C₆H₅ | CH₃—C₆H₄—O | Cl | 5-C₆H₅NH— | 1 | C₆H₅ | CH₃—C₆H₄—O |

What is claimed is:
1. Compounds of the structures

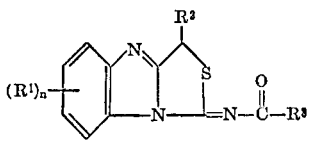

and

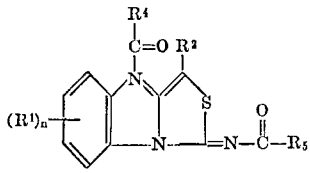

wherein $R^1$ is selected from the group consisting of halogen, hydroxy, nitro, lower alkyl, aryl, lower alkylaryl, aryl-lower alkyl, lower alkoxy, cyano, thiocyano, arylamino, alkylamino or

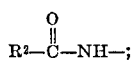

$R^2$ is selected from the group consisting of hydrogen, alkyl containing 1 to 5 carbons, aryl, alkylaryl, or arylalkyl, $R^3$ is selected from the group consisting of any of the $R^2$ radicals, alkylamino, arylamino, aryl-lower alkylamino, lower alkylarylamino, and

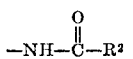

$R^4$ is selected from the group consisting of any of the $R^2$ radicals, alkoxy or aryloxy; $R^5$ is selected from the group consisting of any of the $R^2$ radicals, lower alkylamino, arylamino, aryl-lower alkylamino, lower alkylarylamino,

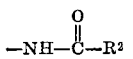

alkoxy or aryloxy; where in each of $R^1$, $R^2$, $R^3$, $R^4$ and $R^5$ unless otherwise indicated alkyl and lower alkyl is unsubstituted or substituted with halogen and contains from 1 to 7 carbons and aryl is unsubstituted phenyl or naphthyl or phenyl or naphthyl substituted with a halogen or nitro and $n$ is 0, 1 or 2 and pharmaceutically acceptable salts thereof.

2. Compounds in accordance with claim 1 having the structure

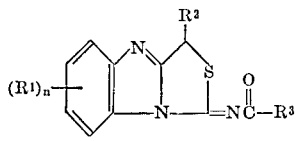

wherein $R^3$ is alkylamino, arylamino or

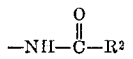

3. Compounds in accordance with claim 1 having the structure

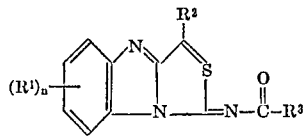

wherein $R^3$ is hydrogen, lower alkyl, aryl, alkylaryl or arylalkyl.

4. Compounds in accordance with claim 1 having the structure

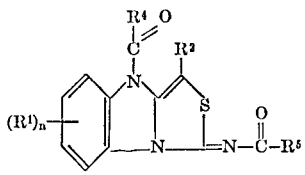

wherein $R^4$ and $R^5$ are the same and are alkyl or aryl.

5. Compounds in accordance with claim 1 having the structure

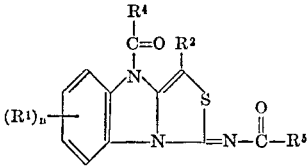

wherein $R^4$ is alkyl or aryl and $R^5$ is alkylamino, arylamino or

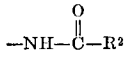

6. Compounds in accordance with claim 1 having the structure

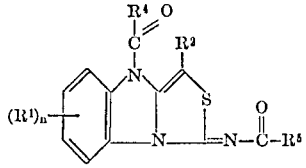

wherein $R^4$ and $R^5$ are the same and are alkoxy or aryloxy.

References Cited

Wagner et al., Synthetic Organic Chemistry, N.Y., John Wiley & Sons, 1953, pp. 566-8, 645.

R. J. GALLAGHER, Primary Examiner

U.S. Cl. X.R.

260—309.7; 424—200, 270